US012789843B2

(12) United States Patent
Lord et al.

(10) Patent No.: US 12,789,843 B2
(45) Date of Patent: Nov. 10, 2026

(54) FAST-PATH COMPUTING ARCHITECTURE FOR FAST-REACTION-TIME DECISION-MAKING IN AUTONOMOUS VEHICLES

(71) Applicant: Stack AV Co., Mount Pleasant, PA (US)

(72) Inventors: Dale Lord, Gibsonia, PA (US); Mark Ollis, Pittsburgh, PA (US); Thomas Petroff, Pittsburgh, PA (US)

(73) Assignee: Stack AV Co., Mount Pleasant, PA (US)

( * ) Notice: Subject to any disclaimer, the term of this patent is extended or adjusted under 35 U.S.C. 154(b) by 39 days.

(21) Appl. No.: 18/647,732

(22) Filed: Apr. 26, 2024

(65) Prior Publication Data

US 2025/0333077 A1 Oct. 30, 2025

(51) Int. Cl.
*B60W 60/00* (2020.01)
*B60W 50/00* (2006.01)

(52) U.S. Cl.
CPC ........ *B60W 60/0011* (2020.02); *B60W 50/00* (2013.01); *B60W 60/0015* (2020.02); *B60W 2050/009* (2013.01); *B60W 2555/20* (2020.02); *B60W 2556/10* (2020.02)

(58) Field of Classification Search
CPC ............. B60W 60/0011; B60W 50/00; B60W 60/0015; B60W 2050/009; B60W 2555/20; B60W 2556/10
See application file for complete search history.

(56) References Cited

U.S. PATENT DOCUMENTS

| | | | | |
|---|---|---|---|---|
| 2019/0278277 A1* | 9/2019 | Tao | .................... | B60W 60/0011 |
| 2021/0373566 A1* | 12/2021 | Agarwal | ......... | B60W 30/18145 |
| 2023/0339512 A1* | 10/2023 | Kosiak | ............... | B60W 60/0011 |
| 2024/0101154 A1* | 3/2024 | Edling | .............. | B60W 60/0015 |
| 2024/0253663 A1* | 8/2024 | Spielberg | .......... | B60W 60/0015 |

OTHER PUBLICATIONS

Cheng et al. (May 2022). "Real-Time Trajectory Planning for Autonomous Driving with Gaussian Process and Incremental Refinement," arXiv:2205.11853; 8 pages.

* cited by examiner

*Primary Examiner* — Rodney A Butler
(74) *Attorney, Agent, or Firm* — Morrison & Foerster LLP

(57) ABSTRACT

A method for selecting a trajectory for a vehicle includes receiving first perception data from one or more sensors positioned on the vehicle at a first time; generating at least one nominal trajectory based on the first perception data; receiving second perception data from the one or more sensors at a second time after the first time; generating at least one fast-path trajectory based on the second perception data; selecting a trajectory from the at least one nominal trajectory and the at least one fast-path trajectory.

23 Claims, 5 Drawing Sheets

FAST-PATH COMPUTING ARCHITECTURE FOR FAST-REACTION-TIME DECISION-MAKING IN AUTONOMOUS VEHICLES

FIELD

This disclosure relates generally to trajectory planning for autonomous vehicles and more specifically to computing architectures that mitigate computational delay in trajectory planning.

BACKGROUND

Conventional autonomous vehicle trajectory planning techniques often leverage layered trajectory planning architectures. These architectures often include layers dedicated to selecting semantic actions such as lane changes, formulating constraints to be passed to a trajectory optimizer layer, trajectory optimization layers for responsible for producing one or more dynamically feasible trajectories, and trajectory scoring/selection layers responsible for selecting one of the trajectories for execution.

SUMMARY

As noted above, conventional autonomous vehicle trajectory planning techniques often leverage layered trajectory planning architectures. These conventional architectures can impose unacceptably long latency in response to sudden changes in the environment. For example, each layer of a conventional trajectory planning architecture can consume 100 milliseconds or more of processing time, leading to lags approaching half a second in trajectory planning alone. Moreover, trajectory planning processing delays are combined with processing times required for perception and prediction, leading to unacceptable lags from perception to trajectory selection. During the time it takes to generate, optimize, and select a trajectory using such conventional architectures, vehicle environment conditions can change. Other vehicles may unexpectedly swerve into the path of the trajectory, and due to the lag in processing, there may not be sufficient time to generate a new trajectory to avoid a collision.

In order for autonomous vehicles to be able to perform partially-autonomous and fully-autonomous navigation in a safe and reliable manner, techniques for reliable, fast, and computationally efficient determination of collision-free trajectories are needed. The techniques described herein directly address the limitations of conventional trajectory planning architectures by providing dual trajectory planners, one of which may be referred to herein as a nominal trajectory planner, nominal path, etc., and another which may be referred to herein as a fast path, fast path trajectory planner, etc. The fast path may bypass one or more phases/layers of the nominal trajectory planner. That is, the techniques described herein generate trajectories utilizing both a fast path and a nominal path and compare the outputs of both trajectory planners to select an optimal trajectory for the vehicle. Accordingly, described herein are systems, devices, methods, and non-transitory computer readable storage media for generating trajectories (e.g., for autonomous vehicles) that both enables generation of optimized trajectories using a nominal trajectory planner and at the same time accounts for rapidly changing conditions in the environment using a parallel fast path trajectory planner that bypasses one or more optimization layers included in the nominal trajectory planning techniques.

An exemplary system (e.g., a computing system for an autonomous vehicle) may receive perception data at a first time via one or more sensors provided on the vehicle. The system may generate one or more nominal trajectories using a first trajectory planner, referred to herein as a nominal trajectory planner. The nominal trajectory planner may generate one or more constraints based on the perception data received at the first time, and may generate one or more trajectories based on the one or more constraints. The system may receive second perception data at a second time after the first time (e.g., after receipt of the second perception data), and may generate at least one fast-path trajectory based on the second perception data. The fast-path trajectory may be generated by a separate, parallel, processing pathway from the first pathway that generated the one or more nominal trajectories, referred to herein as a fast path trajectory planner. In some examples, the first trajectory planner and the fast-path trajectory planner may share compute resources (e.g., processor(s), memory, cache, etc.). In some examples, the first trajectory planner and the fast-path trajectory planner may utilize separate compute resources (e.g., processor(s), memory, cache, etc.). The fast-path trajectory planner may be time-bound to a predefined time frame for generating a trajectory and/or may only generate new constraints for priority environmental conditions (for instance, objects within a threshold distance of the autonomous vehicle and/or previously selected trajectory), which may ensure that a trajectory is generated in a fraction of the total time for generating a trajectory via the nominal trajectory planner.

Thus, the fast path can generate one or more trajectories that account for changes in road conditions that occur during the time it takes the nominal path to complete a single iteration of trajectory generation. The system may be configured to select from the at least one fast-path trajectory and the one or more nominal trajectories, for instance, based on a variety of metrics (e.g., safety metrics, comfort metrics, feasibility metrics) associated with each generated trajectory. The selected trajectory may be utilized by control systems to control an autonomous vehicle (e.g., steering, throttle, break controls).

An exemplary method for selecting a trajectory for a vehicle, the method comprises: receiving first perception data from one or more sensors positioned on the vehicle at a first time; generating at least one nominal trajectory based on the first perception data; receiving second perception data from the one or more sensors at a second time after the first time; generating at least one fast-path trajectory based on the second perception data; selecting a trajectory from the at least one nominal trajectory and the at least one fast-path trajectory.

In some examples, generating at least one fast-path trajectory based on the second perception data comprises; determining at least one priority constraint based on the second perception data, wherein the at least one priority constraint comprises a constraint not determined based on the first perception data; and modifying a previously selected trajectory based on the at least one priority constraint.

In some examples, the at least one priority constraint is determined based on a priority environmental feature.

In some examples, the priority environmental feature comprises a detected environmental feature determined to be a priority environmental feature based on one or more predefined criteria.

In some examples, modifying the previously selected trajectory comprises applying a time bounded modification to the previously selected trajectory.

In some examples, applying the time bounded modification comprises applying a non-linear optimization technique.

In some examples, the at least one priority constraint is determined based on a detected object not detected in the first perception data.

In some examples, the priority constraint is determined based on a detected object within a temporal or spatial tolerance of a previous trajectory of the vehicle.

In some examples, the priority constraint is determined based on a detected object predicted to intersect with the previously selected trajectory of the vehicle.

In some examples, the priority constraint is determined based on a detected vulnerable road user.

In some examples, the selected trajectory is selected based on a most up to date perception data.

In some examples, selecting the trajectory comprises: generating respective trajectory scores for the at least one nominal trajectory and the at least one priority trajectory; comparing the respective trajectory scores for the at least one nominal trajectory and the at least one fast-path trajectory; and selecting a trajectory based on the comparison of the respective scores generated for each trajectory.

In some examples, the respective trajectory scores are generated based on at least one of a safety metric, a feasibility metric, and a comfort metric.

In some examples, the method comprises determining a vehicle control command based on the selected trajectory.

In some examples, the method comprises transmitting a signal to a vehicle control component based on the determined vehicle control command.

In some examples, the method comprises controlling at least one of a throttle, brake, or steering input of the vehicle based on the signal.

In some examples, generating the at least one nominal trajectory comprises: for an action to be executed by the vehicle: determining a plurality of constraints associated with the action based on the first perception data; and generating at least one feasible trajectory based on the plurality of constraints associated with the selected action.

In some examples, the plurality of constraints are determined based on at least one of static obstacles, dynamic obstacles, predicted actions of other actors, road features, speed limits, trajectory curvature limits, map data, and vehicle capabilities In some examples, the at least one nominal trajectory is generated without reference to a previously selected trajectory.

In some examples, generating the at least one nominal trajectory comprises generating a plurality of feasible trajectories.

In some examples, the method comprises storing the at least one nominal trajectory in a memory during a time between generating the at least one nominal trajectory and generating the at least one fast-path trajectory.

An exemplary system for selecting a trajectory for a vehicle comprises one or more processors and memory storing one or more computer programs that include computer instructions, which when executed by the one or more processors, cause the system to: receive first perception data from one or more sensors positioned on the vehicle at a first time; generate at least one nominal trajectory based on the first perception data; receive second perception data from the one or more sensors at a second time after the first time; generate at least one fast-path trajectory based on the second perception data; select a trajectory from the at least one nominal trajectory and the at least one fast-path trajectory.

An exemplary non-transitory computer readable storage medium stores instructions for selecting a trajectory for a vehicle, the instructions configured to be executed by one or more processors of a computing system to cause the system to: receive first perception data from one or more sensors positioned on the vehicle at a first time; generate at least one nominal trajectory based on the first perception data; receive second perception data from the one or more sensors at a second time after the first time; generate at least one fast-path trajectory based on the second perception data; select a trajectory from the at least one nominal trajectory and the at least one fast-path trajectory.

In some embodiments, any one or more of the characteristics of any one or more of the systems, methods, and/or computer-readable storage mediums recited above may be combined, in whole or in part, with one another and/or with any other features or characteristics described elsewhere herein.

BRIEF DESCRIPTION OF THE FIGURES

A better understanding of the features and advantages of the present disclosure will be obtained by reference to the following detailed description that sets forth illustrative embodiments, in which the principles of the disclosure are utilized, and the accompanying drawings of which.

DETAILED DESCRIPTION

Figure 1:
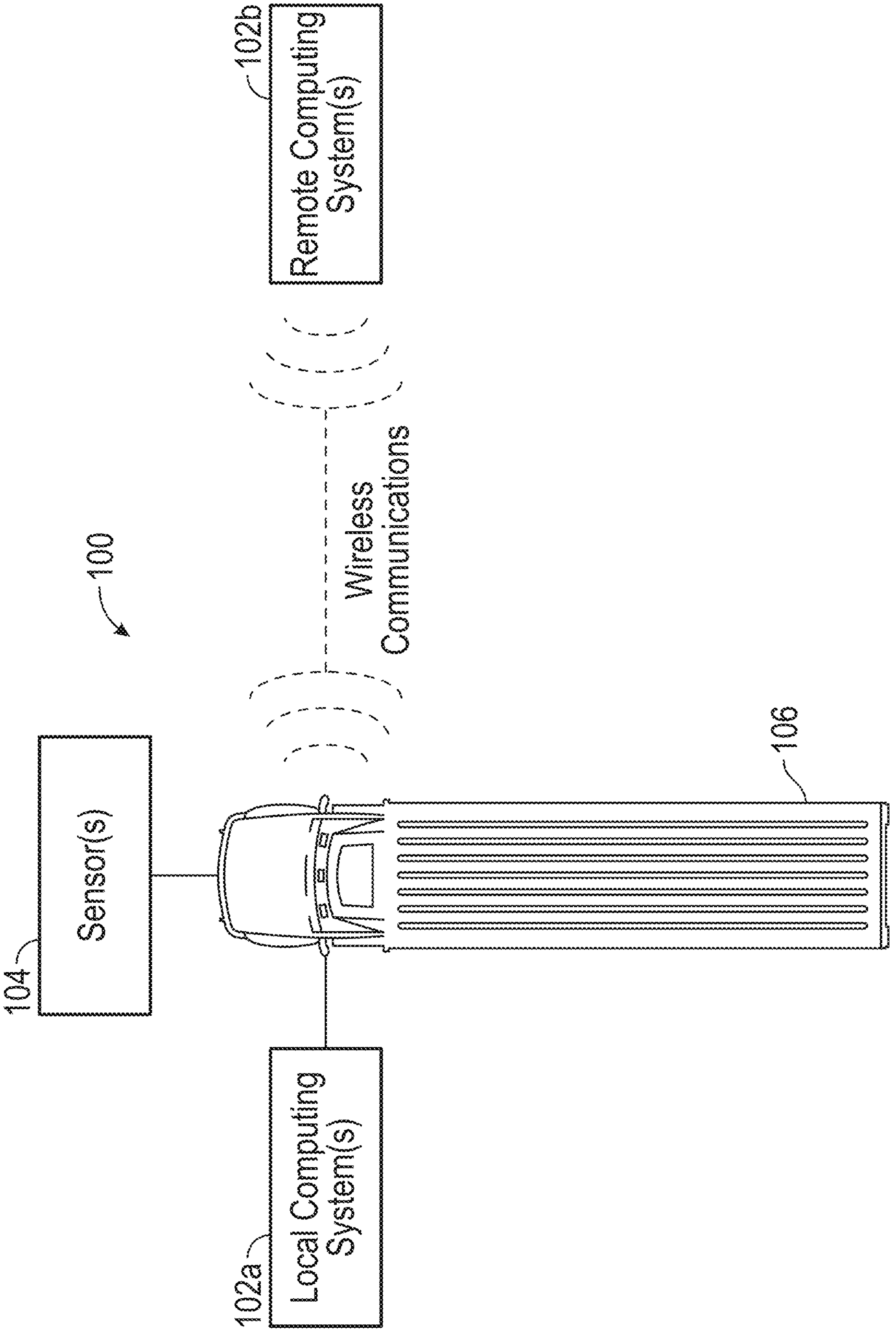
FIG. 1 illustrates an exemplary system for autonomous vehicle trajectory planning.

Described herein are systems, methods, apparatuses, and non-transitory computer readable storage media for autonomous vehicle trajectory planning that both enables generation of optimized trajectories based utilizing a first, nominal trajectory planner and enables response to rapidly changing road conditions via a second, computationally bound trajectory planner. An exemplary system may include a trajectory planning computing system configured to receive perception data including data pertaining to the environment of a vehicle, such as an autonomous vehicle. The vehicle for which trajectory planning is executed using the techniques described herein may be referred to throughout as the host vehicle. The computing system may be configured to receive first perception data detected by one or more sensors positioned on the vehicle at a first time. The perception data may be processed to detect static environmental features (e.g., features that do not move and/or change with time) and/or dynamic environmental features (e.g., features that do not move and/or change with time), for instance, using one or more image processing algorithms such as object detection and/or tracking algorithms. The perception data may further be processed to generate prediction data that includes predicted future behaviors of the detected environmental features, such as their trajectories.

Based on the perception data and/or prediction data, the computing system may be configured to generate at least one nominal trajectory based on the first perception data. The nominal trajectory may be generated by a first trajectory planner configured to generate optimized autonomous vehicle trajectories. The first trajectory planner may include several processing layers, such as a discrete decision layer, constraint generation layer, and/or trajectory optimization layer. The discrete decision layer may be configured to determine one or more candidate actions to be executed by the host vehicle. The constraint generation layer may be configured to generate one or more constraints (e.g., spatial constraints, temporal constraints, spatial-temporal constraints) associated with the one or more candidate actions. The trajectory optimization layer may be configured to generate and optimize one or more trajectories (e.g., optimized using a Gaussian optimization algorithm) based on the constraints which may each be input to a trajectory selection layer described below.

The computing system may further be configured to receive second perception data from the one or more sensors at a second time after the first time. The second perception data may be received for instance, during an iteration of trajectory generation by the first trajectory planner described above, and may indicate a change in road conditions, such as a swerving vehicle that presents a collision threat. Thus, by the time that a trajectory is selected from the first trajectory planner, that trajectory may be outdated and unsafe. The second perception data may be processed to identify such changes in road conditions and generate constraints based on the changes. For instance, if a swerving vehicle is detected and/or predicted to be on a collision course with the host vehicle, a constraint may be generated that indicates the host vehicle should avoid a trajectory that intersects with the swerving vehicle.

The computing system may be configured to generate at least one fast-path trajectory based on the second perception data. The fast-path trajectory may be generated by modifying a previously selected trajectory (and/or other previously generated trajectory) and may be generated utilizing a second trajectory planner different from the first. The second trajectory planner may be computationally bound to ensure that a trajectory generated by the second trajectory planner is produced faster than one generated by the first trajectory planner. Computationally bound, as used herein, may refer to consideration of a limited number of objects for constraint generation. For instance, constraints generated via the fast path may only be generated based on a vehicle immediately in front of and immediately adjacent to the host vehicle. Computationally bound may also refer to fast path trajectory optimization being subject to a predefined time bound. The time bound may be enforced by terminating the optimization computation after the allowed time has expired (if convergence has not been achieved by that point) and outputting the trajectory that minimizes constraint cost among those evaluated within that time.

The second trajectory planner may include a priority constraint generation layer and a trajectory generation layer. The priority constraint generation layer may be configured to generate constraints (e.g., spatial constraints, temporal constraints, spatial-temporal constraints) for a limited number of environmental conditions, which may be referred to herein as priority environmental conditions. Priority environmental conditions may include objects not detected in the first perception data, objects within a threshold distance of the autonomous vehicle and/or the previously selected trajectory, objects predicted to intersect with the autonomous vehicle and/or the previously selected trajectory, vulnerable road users (e.g., pedestrians, cyclists), or other objects determined to be priority objects based on, for instance, a user defined criteria. The trajectory generation layer may also be time-bound to under a predefined, e.g., 100 ms, total processing time. By computationally limiting the constraint generation and/or trajectory generation layers, the second trajectory planner can generate trajectories more efficiently than the first trajectory planner.

The second trajectory planner (e.g., the fast path) may continuously generate one or more trajectories based on previously selected/generated trajectories. The second trajectory planner may not detect any priority environmental conditions in some examples, and thus may not always modify the previously selected/previously generated trajectories. That is, in some examples, a trajectory generated by the fast path may be identical to a previously selected or previously generated trajectory.

The computing system may be configured to select a trajectory from the at least one nominal trajectory and the at least one fast-path priority trajectory. To make the selection, computing system may consider the most up to data perception, prediction, and/or map data associated with the host vehicle's environment, which enables the computing system to appropriately select a fast-path trajectory which may be, for instance, less comfortable (e.g., due to more intense curvature or other more intense acceleration), but enables the vehicle to avoid a collision with an object not accounted for by the nominal path based on the first perception data. The computing system may be configured to determine metrics (e.g., safety metrics, comfort metrics, feasibility metrics) for each trajectory. The computing system may further determine scores for each trajectory based on the metrics and select a trajectory with the highest score based on the most up to date perception, prediction, and/or map data. The selected trajectory may then be utilized to determine vehicle controls (e.g., throttle, steering, break controls).

The techniques described herein provide a number of technical advantages over conventional trajectory planning systems. Combining the fast-path trajectory planner in parallel with a nominal trajectory planner enables the systems and methods described herein to generate trajectories in a fraction of the time when compared to standalone conventional techniques to address rapidly changing road conditions. Moreover, the systems and methods described herein do not sacrifice trajectory optimization provided by higher latency conventional systems. Rather, the systems and methods described herein compare the output of the two trajectory planners and select the optimal trajectory given current road conditions. As such, the systems and method described herein continuously weigh comfort, safety, and other factors to ensure that the vehicle maintains a comfortable, but collision free trajectories. Furthermore, the fast path may be configured to generate a trajectory by modifying previously selected trajectories, considering the constraints generated during a previous iteration of trajectory planning. That is constraints may be carried over, enabling the fast path to accurately and efficiently identify changes in road conditions that should be prioritized in trajectory planning, and these changes can be rapidly addressed via changes to an already existing trajectory.

In the following description of the various embodiments, it is to be understood that the singular forms "a," "an," and "the" used in the following description are intended to include the plural forms as well, unless the context clearly indicates otherwise. It is also to be understood that the term "and/or" as used herein refers to and encompasses any and all possible combinations of one or more of the associated listed items. It is further to be understood that the terms "includes, "including," "comprises," and/or "comprising," when used herein, specify the presence of stated features, integers, steps, operations, elements, components, and/or units but do not preclude the presence or addition of one or more other features, integers, steps, operations, elements, components, units, and/or groups thereof.

Certain aspects of the present disclosure include process steps and instructions described herein in the form of an algorithm. It should be noted that the process steps and instructions of the present disclosure could be embodied in software, firmware, or hardware and, when embodied in software, could be downloaded to reside on and be operated from different platforms used by a variety of operating systems. Unless specifically stated otherwise as apparent from the following discussion, it is appreciated that, throughout the description, discussions utilizing terms such as "processing," "computing," "calculating," "determining," "displaying," "generating" or the like, refer to the action and processes of a computer system, or similar electronic computing device, that manipulates and transforms data represented as physical (electronic) quantities within the computer system memories or registers or other such information storage, transmission, or display devices.

The present disclosure in some embodiments also relates to a device for performing the operations herein. This device may be specially constructed for the required purposes, or it may comprise a general-purpose computer selectively activated or reconfigured by a computer program stored in the computer. Such a computer program may be stored in a non-transitory, computer readable storage medium, such as, but not limited to, any type of disk, including floppy disks, USB flash drives, external hard drives, optical disks, CD-ROMs, magnetic-optical disks, read-only memories (ROMs), random access memories (RAMs), EPROMS, EEPROMs, magnetic or optical cards, application specific integrated circuits (ASICs), or any type of media suitable for storing electronic instructions, and each connected to a computer system bus. Furthermore, the computing systems referred to in the specification may include a single processor or may be architectures employing multiple processor designs, such as for performing different functions or for increased computing capability. Suitable processors include central processing units (CPUs), graphical processing units (GPUs), field programmable gate arrays (FPGAs), and ASICs.

The methods, devices, and systems described herein are not inherently related to any particular computer or other apparatus. Various general-purpose systems may also be used with programs in accordance with the teachings herein, or it may prove convenient to construct a more specialized apparatus to perform the required method steps. The structure for a variety of these systems will appear from the description below. In addition, the present invention is not described with reference to any particular programming language. It will be appreciated that a variety of programming languages may be used to implement the teachings of the present disclosure as described herein.

FIG. 1 illustrates an exemplary system 100 for autonomous vehicle trajectory planning. System 100 may include one or more local computing systems 102*a*. The local computing systems 102*a* may be provided on a vehicle 106. One or more sensors 104 may also be provided on vehicle 106 and connected to local computing system(s) 102*a*. Sensors 104 may include cameras (e.g., thermal, RGB), LiDAR, radar, auditory sensors, ultrasonic sensors, inertial measurement unit sensors, GPS, fault detection sensors, and any other sensor configured to detect information about the internal and/or external environment of vehicle 106. In some examples, one or more remote computing systems 102*b* are optionally located remotely from the vehicle 106 and connected to sensors 104 and/or local computing system(s) 102*a*. The one or more remote computing systems 102*b* may be located, for instance, on another vehicle in communication with vehicle 106 and/or located at a stationary location such as an office or transportation/distribution hub.

Vehicle 106 may be configured to operate partially or fully autonomously utilizing the sensor data obtained using sensors 104. The one or more local computing systems 102*a* and/or one or more remote computing systems 102*b* may be configured to generate a plurality of trajectories (e.g., for autonomous vehicle navigation). The one or more local computing systems 102*a* and/or one or more remote computing systems 102*b* may include a computing architecture that has two trajectory planners. A first trajectory planner may include a plurality of constraint generation and trajectory optimization layers, and may be referred to herein as a nominal path (e.g., as described below with reference to FIG. 2). A second trajectory planner may operate in parallel to the first, generating trajectories via time-bounded modifications of previously selected trajectories. The second trajectory planner may be referred to herein as a "fast path" and may utilize more up-to-date data (e.g., perception data) than the first trajectory planner and/or may be computationally limited to ensure rapid trajectory generation. In some examples, one or more processors may be configured to implement the nominal path trajectory planner and one or more different processors may be configured to implement the fast path trajectory planner. In some examples one or more processors may be configured to implement both the nominal path and fast path trajectory planners.

Figure 2:
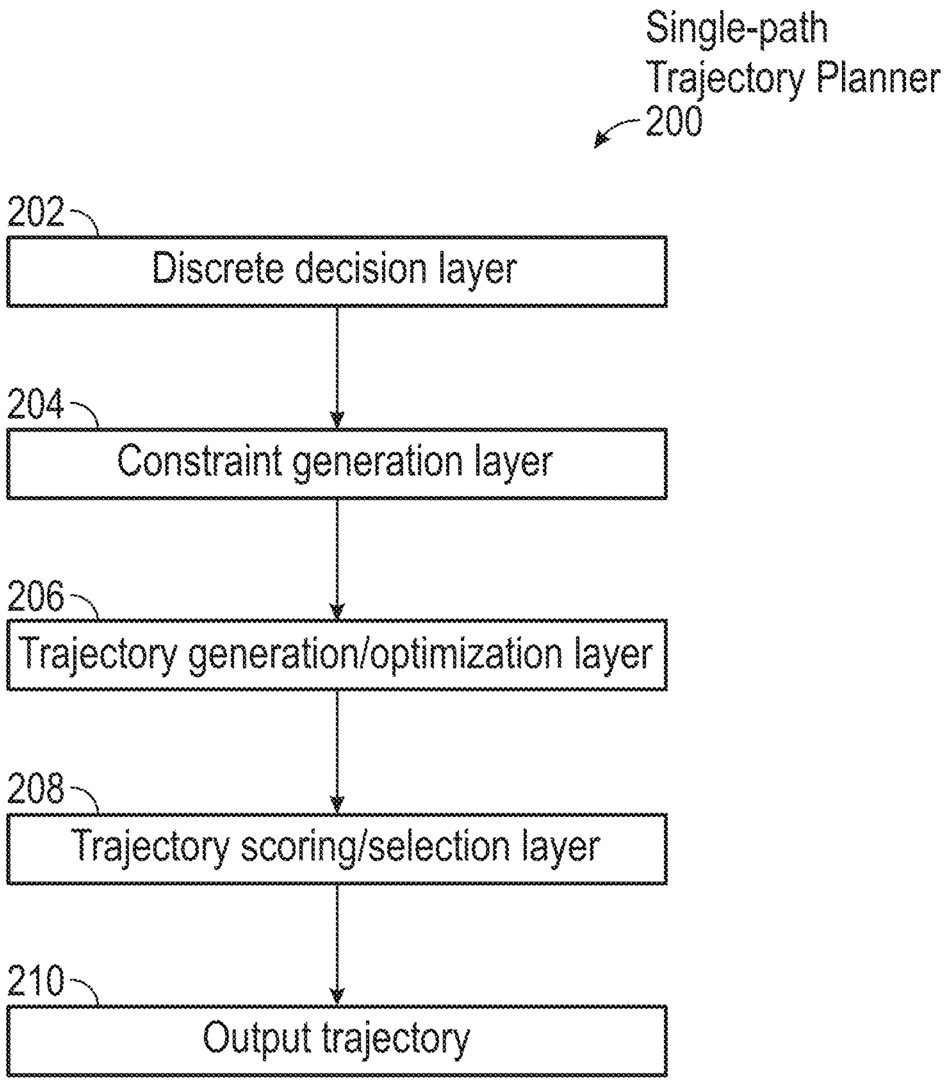
FIG. 2 illustrates a single-path computing architecture for autonomous vehicle trajectory planning according to some examples.

FIG. 2 illustrates a block diagram of a single-path trajectory planning architecture 200. Single-path trajectory planning architecture 200 may include a discrete decision layer 202, a constraint generation layer 204, a trajectory optimization layer 206, and a trajectory scoring/selection layer 208, configured to generate and select an output trajectory 210. While single-path trajectory planning architecture 200 is described with reference to specific components/blocks, it should be understood that one or more components components/blocks may be omitted and various additional and/or different blocks could be included. Single-path trajectory planning architecture 200 is meant to provide an exemplary representation of any single-path trajectory planner trajectory planning in autonomous vehicles.

For example, discrete decision layer 202 may be configured to select actions to be performed by a vehicle such as a lane change, queue/pass, acceleration, deceleration, turn, stop, and so on. The constraint generation layer 204 may be configured to generate constraints to be passed to trajectory optimization layer 206. One or more constraints may be generated, for instance, based on capabilities of the vehicle, perception data (e.g., static and/or dynamic environmental conditions), prediction data (e.g., predicted object trajectories), and/or map data (e.g., from high-definition maps). Constraints may be generated depending on the output of the discrete decision layer. For instance, one or more constraints may be generated in accordance with a lane change action based on environmental conditions associated with the lane change action (e.g., a vehicle in the adjacent lane), and one or more additional or different constraints may be generated in accordance with a queue/pass action based on environmental conditions associated with the queue/pass action. The trajectory generation/optimization layer 206 may be configured to generate and optimize (e.g., via Gaussian optimization or other optimization technique) one or more trajectories in accordance with the one or more constraint sets. A trajectory scoring/selection layer 208 may then score the one or more trajectories in accordance with various evaluation metrics (e.g., safety, comfort) and select an output trajectory 210, for instance, to be transmitted to a controls unit for causing the vehicle to follow the selected trajectory.

Each of the aforementioned layers of the single-path trajectory planner 200 (e.g., 202, 204, 206, and 208) may consume 100 milliseconds or more computational time. This can lead to a total trajectory planning processing time approaching half a second or more. Such processing times are compounded with those of perception and prediction layers (not depicted but commonly included in autonomous vehicle computing systems), leading to substantial time delays from perception to output of a vehicle trajectory. During these time delays, new obstacles may render one or more of the trajectories generated by the single-path trajectory planner 200 unusable and/or unsafe. For instance, an adjacent vehicle could swerve into a traveled lane before single-path trajectory planner 200 has time to generate a new trajectory to avoid a collision. Described herein are trajectory planning architectures that include both a nominal trajectory planner such as single-path trajectory planner 200 as well as a computationally bounded trajectory planner that can rapidly generate trajectories in parallel with a nominal trajectory planner based on more up-to-date perception data. The techniques described here can generate optimized trajectories accounting for long range perception and prediction (using one planner similar to single-path trajectory planner 200) while also accounting for rapidly changing road conditions (using a secondary, computationally bounded, trajectory planner, which may be referred to herein as a "fast path").

Figure 3:
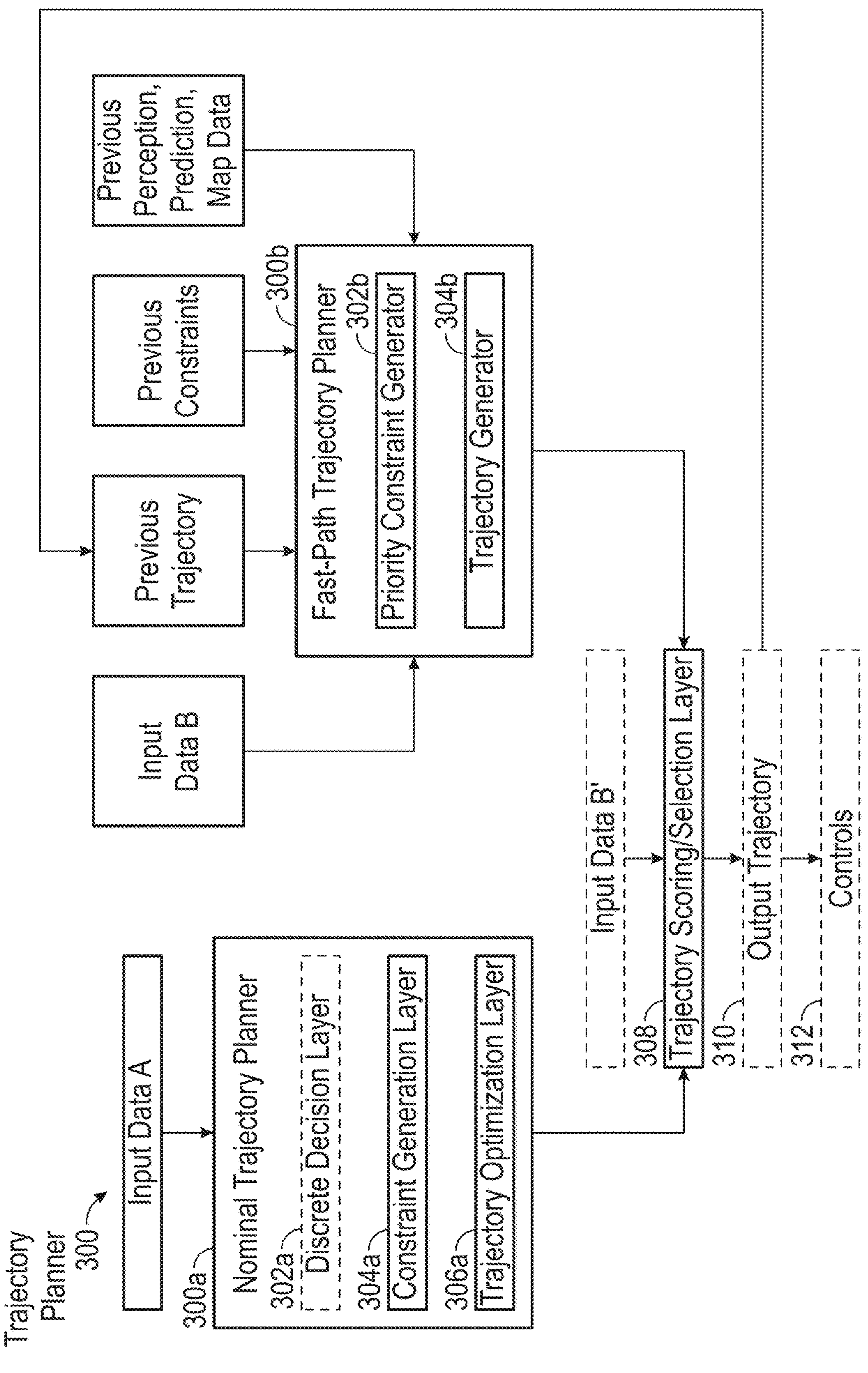
FIG. 3 illustrates an exemplary computing architecture for autonomous vehicle trajectory planning according to some examples.

FIG. 3 illustrates an exemplary diagram of a trajectory planner 300 that includes a nominal trajectory planner 300*a* and a fast-path trajectory planner 300*b*. Trajectory planner 300 may be implemented as part of local computing system(s) 102*a* and/or remote computing system(s) 102*b* of FIG. 1. The nominal trajectory planner 300*a* may include any of the features included in a single-path vehicle trajectory planning computing architectures. For instance, nominal trajectory planner 300*a* may function similarly to the single-path architecture 200 described above to generate vehicle trajectories. In contrast to single-path autonomous vehicle trajectory planners, trajectory planner 300 also includes a second trajectory planner, fast path trajectory planner 300*b*. Fast path trajectory planner 300*b* is configured to generate trajectories accounting for rapidly changing road conditions that nominal trajectory planner cannot address due to time delays in generating a new optimized trajectory using nominal trajectory planner 300*a*.

Trajectory planner 300 may be implemented using a computing system that includes, for example, one or more electronic devices implementing a software platform. In some examples, trajectory planner 300 is implemented using one or more electronic devices. In some embodiments, trajectory planner 300 is implemented using a client-server system, and the blocks of architecture 300 are divided up in any manner between the server and one or more client devices. Thus, while portions of trajectory planner 300 are described herein as being implemented by particular devices, it will be appreciated that trajectory planner 300 is not so limited. In trajectory planner 300, some blocks are, optionally, combined, the order of some blocks is, optionally, changed, and some blocks are, optionally, omitted. In some examples, layers/modules may be utilized in combination with those depicted in architecture 300. Accordingly, the architecture as illustrated (and described in greater detail below) is exemplary by nature and, as such, should not be viewed as limiting.

Nominal trajectory planner 300*a* may include one or more of the components of the exemplary single-path trajectory planner 200 described above and may function in a similar manner to trajectory planner 200. However, it should be understood that nominal trajectory planner 300*a* is not so limited. Nominal trajectory planner is representative of any single-path trajectory planner for semi-autonomous and/or fully-autonomous vehicles. As illustrated, nominal trajectory planner 300*a* includes at least a constraint generation layer 304*a* and a trajectory optimization layer 306*a*, similar to layers 204 and 206 described above. The constraint generation layer 304*a* may be configured to generate constraints based on input data A that are then input into trajectory optimization layer 306*a*. In some examples, constraint generation layer may receive one or more constraints from one or more previous iterations of trajectory generation. In some examples, constraint generation layer may not receive any constraints from previous iterations (e.g., the nominal trajectory planner 300*a* may start from scratch in each iteration). Input data A may include any of perception data, prediction data, and/or map data and may be received at a first time, e.g., before input data B, which may be received as an input to the fast path trajectory planner 300*b*, as described below. Nominal trajectory planner 300*a* may also include a discrete decision layer 302*a*. The discrete decision layer 302*a* may be configured to select actions to be performed by a vehicle such as a lane change, queue/pass, acceleration, deceleration, turn, stop, and so on, as described above. However, it should be understood that decisions regarding actions to be performed by the vehicle may be made by other vehicle computing system components and/or may be selected by a user, e.g., a driver in a partially autonomous vehicle.

Constraint generation layer 304*a* may formulate constraints to be passed to a trajectory optimization layer 306*a* depending on the action to be executed by the vehicle. For instance, different constraints may be generated for different actions (e.g., lane changes and pass-queue decisions) that may be received from a discrete decision layer 302*a*. Constraint generation layer 304*a* may combine prediction information and long-range perception information with map constraints to refine a reference path that may be either stored in the map or computed a priori from map features. That is, constraints may be generated based on perception information (e.g., static and dynamic environmental conditions within a threshold range of vehicle sensors), prediction information (e.g., predicted behaviors/trajectories of other actors on the roadway), and map data (e.g., road geometries obtained from maps, overall routes, geolocation, heading, destination, etc.). The reference path may, for instance, include a continuous path or series of points along a path forward of the vehicle that may be optimized/modified by the trajectory optimization layer 306*a* to generate a plurality of trajectories for a plurality of possible actions. In some examples, the reference path is determined based on a lane center, a lane boundary, a reference vehicle, a curb, or any other road feature.

Trajectory optimization layer 306a may be configured to optimize the reference path based on one or more sets of constraints to generate one or more trajectories for an autonomous vehicle. The trajectory optimization layer 306a may employ a gaussian function or probability distribution to generate one or more smooth, collision free, trajectories. In some examples, trajectory optimization may be configured to simultaneously consider spatial and temporal constraints to generate both a trajectory and a speed along that path. In some examples, speed profile planning may be decoupled from trajectory generation such that one or more trajectories are generated using trajectory optimization layer 306a and then one or more speed profiles are determined for the one or more trajectories. Trajectory optimization layer 306a may optimize one or more trajectories based on one or more sets of constraints and output the one or more trajectories along with tolerances that may define permissible deviations from the one or more trajectories. The one or more trajectories, optionally along with the respective tolerances, may be input into a trajectory scoring layer 308 along with at least one trajectory generated using a parallel fast path trajectory planner 302b, as described further below.

Fast path trajectory planner 300b may be configured to generate one or more trajectories (e.g., for an autonomous vehicle) that may account for more up-to-date input data relative to trajectories generated by nominal trajectory planner 300a. For instance, nominal trajectory planner 300a may receive input data A, which may include perception data, prediction data, and/or map data at time t−1 and generate a plurality of trajectories based on input data A. Fast path trajectory planner 300b may receive input data B subsequently at time after time t−1 (e.g., t−0.5) and generate at least one trajectory more rapidly than nominal trajectory planner 300a (e.g., using a time-bounded trajectory generation module, for instance, by making small modifications to previously selected trajectories). Input data B may include at least perception/object detection data. In some examples, input data B includes perception data, prediction data, and/or map data. Fast path trajectory planner 300b may therefore generate a trajectory that addresses an obstacle on the roadway not accounted for by the nominal trajectory planner 300a, for instance, if that obstacle was not identified in input data A (e.g., another vehicle that swerved into the traveled lane after time t−1). Other inputs to the fast path trajectory planner 300b may include a previously selected trajectory, one or more constraints associated with the previously selected trajectory, and/or perception data, prediction data, and/or map data utilized to generate the constraints associated with the previously selected trajectory.

Fast path trajectory planner may include a priority constraint generator 302b configured to generate priority constraints based on environmental features (e.g., static and/or dynamic features) detected in input data B that satisfy one or more criteria to be designated as priority features. In some examples, priority constraint generator 302b is configured to generate a limited amount of constraints. For instance, priority constraint generator 302b may be configured to generate constraints only for priority environmental features.

As noted above, dynamic environmental features may include features included in input data B that move and/or change with time. For instance, dynamic environmental features may include other actors (e.g., vehicles, cyclists, pedestrians) on the roadway, weather conditions, traffic lights, etc. Static environmental features may include features that do not move and/or change with time. Static environmental features may include, for instance, road features/geometry such as lane lines or boundaries, barriers, curbs, parked vehicles, road curvature, road elevation profile/grade, traffic regulations (e.g., speed limits), etc. An environmental feature (static or dynamic) may be a priority feature if, for instance, it was not detected in input data A, if it is detected within a spatial threshold of the host vehicle, if it is detected within a spatial threshold of a previously selected trajectory, if it is predicted to intersect with or move within a threshold spatial proximity to the host vehicle, if it is predicted to intersect or come within a threshold spatial proximity to a previously selected trajectory, if it is predicted to move within a threshold proximity to a previously selected trajectory and/or the host vehicle within a temporal threshold, and/or if it is a vulnerable road user such as a pedestrian or cyclist. In some examples, constraints generated based on priority environmental features are referred to herein as priority constraints.

In some examples, the previously selected trajectory, one or more constraints associated with the previously selected trajectory, and/or previous perception data, prediction data, and/or map data may also be input into the priority constraint generator 302b. Priority constraint generator 302b may be configured to compare features detected in input data B to perception data, prediction data, and/or map data included in input data A to identify priority features according to one or more of the criteria above. For instance, priority constraint generator 302b may determine that a vehicle included in input data A at 3 meters from the host vehicle was detected at only 1.5 meters from the host vehicle based on input data B. Priority constraint generator 302b may determine that the detected vehicle is likely to intersect with the host vehicle and determine that the detected vehicle is a priority feature that needs to be addressed by trajectory generator 304b of the fast-path trajectory planner 300b to avoid collision.

In some examples, priority constraint generator 302b is configured to generate constraints for a predefined number of objects included in the input data. For instance, priority constraint generator 302b may be configured to generate constraints based on only an immediately preceding vehicle in the host vehicle travel lane, a closest following vehicle behind the host vehicle in the travel lane, and any immediately adjacent vehicles in adjacent lanes on the roadway.

Priority constraints generated by priority constraint generator 302b may be input into trajectory generator 304b. Trajectory generator 304b may be configured to generate at least one trajectory, which may be referred to herein as a fast-path trajectory, based on the one or more priority constraints. Trajectory generator 304b may be configured to generate a fast-path trajectory by modifying the previously selected trajectory based on the priority constraints. In some examples, trajectory generator 304b may apply a time-bounded modification and/or time-bounded optimization to the previously selected trajectory to generate the at least one trajectory. The time-bounded optimization may include any non-linear optimization technique, for instance, an iterative linear quadratic regulator technique, quadratic programming technique, or any other non-linear optimization technique. In some examples, the time-bounded modification and/or optimization is limited to between 1 millisecond and 200 milliseconds. In some examples, the time-bounded modification and/or optimization is limited to at most 150 milliseconds, at most 125 milliseconds, at most 100 milliseconds, at most 75 milliseconds, at most 50 milliseconds, and/or at most 25 milliseconds.

Trajectory planner 300 may include a trajectory scoring/selection layer 308 configured to score and select a trajectory from one or more trajectories generated by the nominal trajectory planner 300*a* and one or more trajectories generated by the fast-path trajectory planner 300*b*. The trajectory scoring/selection layer 308 may be configured to receive as input the one or more trajectories generated by the nominal trajectory planner 300*a* and one or more trajectories generated by the fast-path trajectory planner 300*b*. The trajectory scoring/selection layer 308 may also be configured to receive at least the most up to date perception data. In some examples, trajectory scoring/selection layer 308 is configured to receive the most up to date perception data, prediction data, and map data. In some examples, trajectory scoring/selection layer 308 is configured to receive input data B. In some examples, trajectory scoring/selection layer 308 is configured to receive input data B and input data A. In some examples, trajectory scoring/selection layer 308 is configured to receive input data B', which may be received at a time after input data B is received. That is, trajectory scoring/selection layer 308 may utilize data received by the system at least as recently, if not more recently than, input data B. The trajectory scoring/selection layer 308 may select a trajectory based on any of the above data.

The trajectory scoring/selection layer 308 may be configured to determine a respective trajectory score for each of the one or more trajectories generated by the nominal trajectory planner 300*a* and one or more trajectories generated by the fast-path trajectory planner 300*b*. The respective trajectory scores generated for each of the trajectories may be determined based on one or more metrics. For instance, respective trajectory scores generated for each of the trajectories may be determined based on at least one of a safety metric, a feasibility metric, and/or a comfort metric. A safety metric may be determined based on factors such as likelihood of collisions, severity of such collisions, and/or other factors that my impact the safety of the vehicle, passengers in the vehicle and/or other actors external to the vehicle. A feasibility metric may be determined based on factors such as the host vehicle's capabilities such as maximum velocity, maximum acceleration, maximum turning angles, and so on. A comfort metric may be determined based on factors such as the magnitude of curvature of the trajectory, the required acceleration to follow the trajectory, and so on. Trajectory scoring/selection layer 308 may compare the score(s) for the at least one nominal trajectory and the at least one fast-path trajectory and select a trajectory (output trajectory 310) with the highest score. The selected trajectory output by trajectory scoring/selection layer 308 may be transmitted to a vehicle controls system for executing vehicle controls (e.g., throttle, break, steering) to traverse along the selected trajectory.

Figure 4:
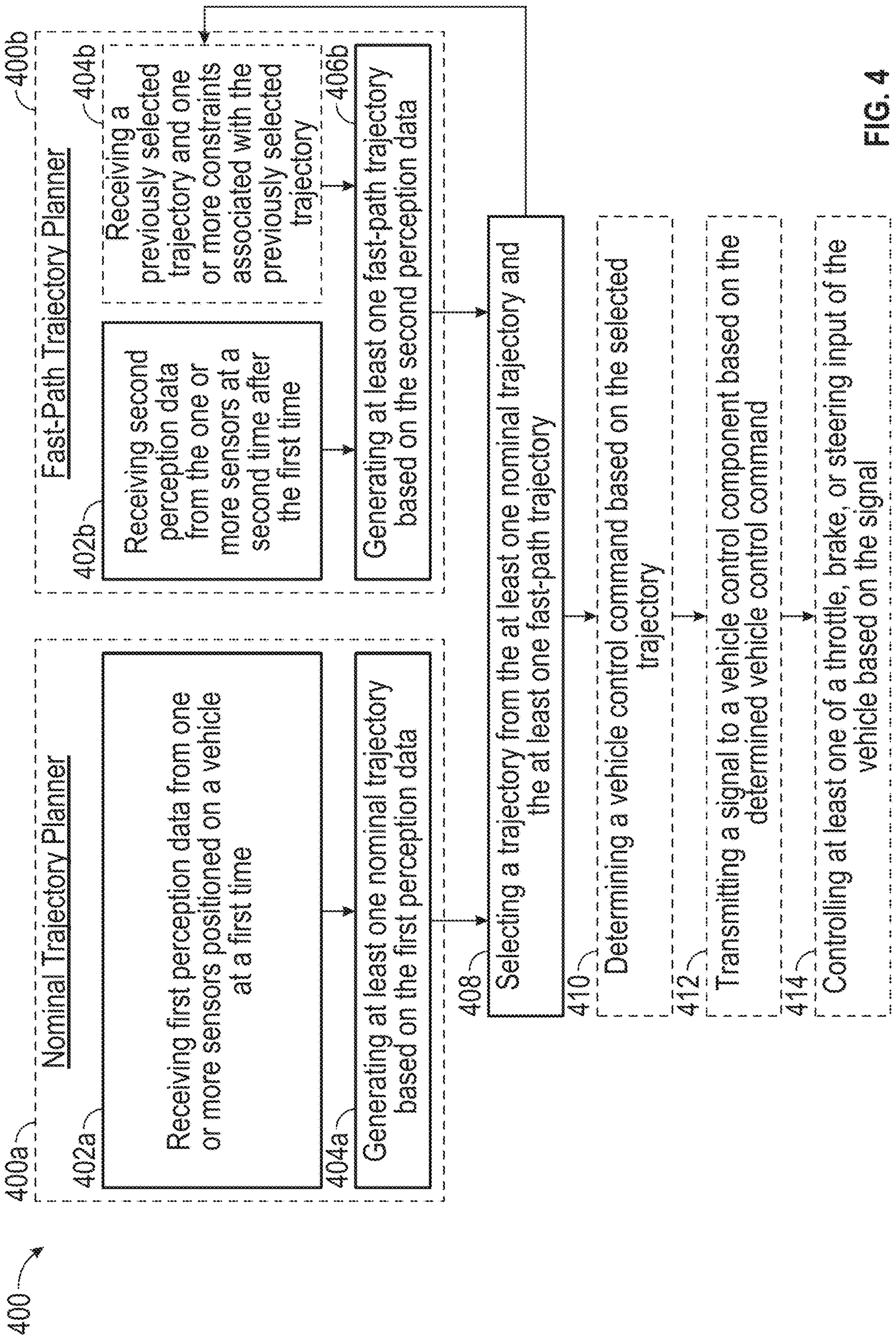
FIG. 4 illustrates an exemplary method for autonomous vehicle trajectory planning according to some examples.

FIG. 4 illustrates an exemplary process 400 for generating trajectories using both a nominal trajectory planner 400*a* (referred to below as "nominal path 400*a*") and a fast-path trajectory planner 400*b* (referred to below as "fast path 400*b*"). Process 400 is performed, for example, using one or more electronic devices implementing a software platform. In some examples, process 400 is performed using one or more electronic devices. In some embodiments, process 400 is performed using a client-server system, and the blocks of process 400 are divided up in any manner between the server and one or more client devices. Thus, while portions of process 400 are described herein as being performed by particular devices, it will be appreciated that process 400 is not so limited. In process 400, some blocks are, optionally, combined, the order of some blocks is, optionally, changed, and some blocks are, optionally, omitted. In some examples, additional steps may be performed in combination with the process 400. Accordingly, the operations as illustrated (and described in greater detail below) are exemplary by nature and, as such, should not be viewed as limiting.

Block 400*a* illustrates nominal path 400*a*. The steps of process 400 performed within the nominal path 400*a* may include any action performed by, for instance, single-path trajectory planner 200 described above. Nominal path 400*a* may be configured to generate one or more trajectories for an autonomous vehicle that can be compared to those generated using fast path 400*b*, enabling an optimal trajectory to be selected from nominal path 400*a* and fast path 400*b*. At block 402*a* of nominal trajectory planning path 400*a*, process 400 includes receiving (e.g., by a computing system performing the process 400) first perception data from one or more sensors positioned on a vehicle at a first time. The perception data may be collected using a variety of sensors positioned on the vehicle. The sensors may include, for instance, lidar sensors, radar sensors, cameras, infrared sensors, audio sensors, and so on.

Sensors may be utilized for detecting information about the external environment of the vehicle. For instance, perception data obtained using the sensors may be input to a computing system performing the method 400 to detect static environmental features and dynamic environmental features. Dynamic environmental features may include other actors (e.g., vehicles, cyclists, pedestrians) on the roadway, weather conditions, traffic lights, etc. Static environmental features may include, for instance, road features/geometry such as lane lines or boundaries, barriers, curbs, parked vehicles, road curvature, road elevation profile/grade, traffic regulations (e.g., speed limits), etc. The computing system performing the method 400 that may predict characteristics of environmental features (e.g., velocities of other actors, trajectories of other actors, etc.) based on the perception data. The system may utilize any type of object detection algorithm and/or predictive modeling algorithm to detect environmental features and predict behaviors (e.g., trajectories, etc.) of those environmental features. For instance, the system may utilize one or more machine learning models trained to perform object detection and/or predictive modeling.

At block 404*a* of nominal path 400*a*, process 400 includes generating at least one nominal trajectory based on the first perception data. Generating the at least one nominal trajectory based on the first perception data may include, for an action to be performed by the vehicle (e.g., lane change, passing, merging, etc.), determining a plurality of constraints associated with the selected action. One or more of the plurality of constraints may be determined based on perception data acquired using the one or more sensors described above. For instance, constraints may be generated based on static and dynamic environmental features detected in the perception data and/or based on predictive modeling (e.g., predicted behaviors, trajectories, etc.) of such environmental features. One or more of the plurality of constraints may additionally or alternatively be generated based on high-definition map data, which may provide information about road geometry, traffic control signals/devices, static obstacles, and so on. In some examples, one or more constraints may additionally or alternatively be determined based on characteristics of the vehicle, such as maximum velocity, maximum turning angles, etc. In some examples, sensors may be provided that monitor the internal environment of the vehicle (e.g., fault detection sensors, cameras, audio sensors, etc.) and constraints may be generated based on detected aspects of the internal environment of the vehicle.

Thus, constraints may be generated based on static and/or dynamic environmental features in the vehicle's environment determined based on the perception data, map data, and/or characteristics of the vehicle, such as maximum velocity, maximum turning angles, etc. The generated constraints may inform a system performing the process 400 where a collision-free trajectory can be generated based on various dynamic and static environmental features identified by the system based on perception data, map data, and/or vehicle characteristic data.

In some examples, one or more constraints of the plurality of constraints are generated for each of a plurality of actions that may be performed by the vehicle. For instance, a lane change action may be received (e.g., from a discrete decision layer such as layer 302*a*). In accordance with receipt of the lane change action, one or more constraints may be generated for performing the lane change action and for execution of the lane change action. One or more constraints may also be determined for continuing on a straight path forward until the lane change action can be executed. That is, a system performing process 400 may generate a plurality of sets of constraints for generating a plurality of possible trajectories in accordance with a received action to be executed by the vehicle.

Fast path 400*b* of process 400 includes steps that provide one or more trajectories that account for more up-to-date perception data than nominal path 400*a*. For instance, perception data utilized by the nominal path may be detected and received at time t−1, while perception data detected and received by the fast path may be received at time t−0.5. Thus, the perception data received by the fast path may detect changes in the external environment of the vehicle that may enable generation of safer trajectories than those generated by the perception data received by the nominal path. In some examples, fast-path 400*b* may be configured to generate only a single trajectory to be compared to one or more trajectories generated by nominal path 400*a*. The steps of fast path 400*b* may be performed in parallel with, but not necessarily at the same time as, the steps of nominal path 400*a*, following at least one iteration of trajectory generation by nominal path 400*b* (and/or following receipt of an initial nominal path trajectory from any other source). The one or more trajectories generated according to the steps of fast-path 400*b* can be compared to those generated by nominal path 400*a* to determine if the fast-path 400*b* generated trajectory is preferable, for instance, if it enables a vehicle to avoid a collision with an obstacle not identified via nominal path 400*a*.

At block 402*b* of fast path 400*b*, process 400 includes receiving (e.g., by a computing system performing the process 400) second perception data from the one or more sensors at a second time, after the first time. The second perception data may be received from the one or more sensors provided on the vehicle, as described above. The second perception data received at the second time following the first time may include one or more environmental features (static and/or dynamic) not present in and/or detected based on the first perception data. For example, at block 404*a* described above, a system performing process 400 may generate one or more trajectories for a lane change maneuver based on constraints generated utilizing the first perception data. The first perception data may not include any obstacles in an adjacent lane into which the host vehicle (e.g., the vehicle including a computing system for performing process 400) is to travel to and thus the nominal trajectory planning path may not generate any constraints that prevent the lane change. Second perception data received at the second time, however, may include an obstacle, such as a vehicle that swerved into the adjacent lane after receipt of the first perception data on a collision course with the trajectory generated using the nominal path 400*a*. Fast path 400*b* may result in a trajectory that avoids the swerving vehicle.

At block 404*b* of fast path 400*b*, process 400 includes receiving (e.g., by a computing system performing the process 400) a previously selected trajectory and one or more constraints associated with the previously selected trajectory. The previously selected trajectory may be a trajectory generated by the nominal path 400*a* or a trajectory generated by the fast path 400*b* and selected by a trajectory scoring/selection layer of a computing architecture (e.g., trajectory scoring layer 308 of FIG. 3). In some examples, the dynamic and/or static environmental features that the one or more constraints associated with the previously selected trajectory were generated based upon at also received at block 404*b*. For instance, a constraint may allow movement by up to x meters away from a centerline of a traveled lane to the right of the host vehicle, indicating a tolerance of deviation from the previously selected trajectory based on the perception data used to generate the previous trajectory. That constraint may have been generated based on a vehicle two lanes to the right of the host vehicle. As descried in further detail below, by providing the fast path 400*b* with both the constraints associated with the previous trajectory as well as the environmental conditions upon which those constraints were generated, fast path 400*b* can rapidly determine changes in environmental conditions to update constraints based on priority environmental conditions (for instance, objects detected based on the second perception data that may result in a collision if the previously selected trajectory is followed), as described below. In some examples, a limited number of constraints and/or environmental features associated with the previously selected trajectory are received at block 404*b*. For instance, those constraints associated with an immediately preceding vehicle in the traveled lane and an immediately adjacent vehicle in an adjacent lane may be the only constraints and/or features received, thereby limiting the computational space for the fast path to expedite trajectory generation.

At block 406*b* of fast path 400*b*, process 400 includes generating at least one trajectory based on the second perception data (e.g., a fast-path trajectory). Generating the at least one fast-path trajectory based on the second perception data may include generating at least one priority constraint based on the second perception data. In some examples, only a limited number of priority constraints are generated at block 406*b*. As described above, in some examples, priority constraints are only generated based on priority environmental features. An environmental feature (static or dynamic) may be a priority feature if, for instance, it was not detected in input data A, if it is detected within a spatial threshold of the host vehicle, if it is detected within a spatial threshold of a previously selected trajectory, if it is predicted to intersect with or move within a threshold spatial proximity to the host vehicle, if it is predicted to intersect or come within a threshold spatial proximity to a previously selected trajectory, if it is predicted to move within a threshold proximity to a previously selected trajectory and/or the host vehicle within a temporal threshold, and/or if it is a vulnerable road user such as a pedestrian or cyclist. In some examples, constraints generated based on priority environmental features are referred to herein as priority constraints.

Accordingly, the at least one priority constraint may include a constraint not generated based on the first perception data. A system performing method 400 may generate a priority constraint based on an environmental feature detected based on the second perception data that was not detected in the first perception data (the perception data used by the nominal path 400*a*). For instance, if an object (e.g., a falling rock, dislodged tire, etc.) enters the roadway within a sensor range of the one or more sensors on the vehicle after receipt of the first perception data but before receipt of the second perception data, the second perception data may include an object not detected in the first perception data. The aforementioned example is meant to be exemplary and not limiting. An object may have not been detected in the first perception data due to, for instance, a sensor malfunction, software failure, sensor blind spot, and so on.

In some examples, a system performing method 400 may generate a priority constraint based on an environmental feature detected or predicted to move within a temporal or spatial tolerance of a previous trajectory of the vehicle based on the second perception data. For instance, the previously selected trajectory may have been generated in accordance with a lane change action. The trajectory may extend from the position of the host vehicle at the time the trajectory was generated to an adjacent lane into which the host vehicle is to traverse. At the time the previously selected trajectory was generated there may have been no other environmental features (e.g., vehicles, pedestrians, etc.) within x meters of the trajectory, where x is a spatial threshold defining a boundary around the trajectory. The boundary may define a region surrounding the trajectory within which a detected object poses a threat (e.g., collision threat) to the host vehicle. At the time the previously selected trajectory was generated there may have also been no environmental features (e.g., vehicles, pedestrians, etc.) predicted to fall within a spatial threshold x of the previously selected trajectory within a temporal threshold y. A priority constraint may be determined in accordance with detecting an environmental feature (e.g., other vehicle, pedestrian, etc.) within the spatial threshold x or predicted to move within the spatial threshold x within temporal threshold y.

In some examples, a system performing method 400 may generate a priority constraint based on a detected object predicted to intersect with the previous trajectory of the vehicle. In some examples, a system performing method 400 may generate a priority constraint based on a detected vulnerable road user. Vulnerable road users may include cyclists, motorcyclists, and pedestrians. As described below, priority constraints may, for instance, cause fast path 400*b* to generate a trajectory that deviates from the previously selected trajectory to avoid any of the detected environmental features/objects described above.

Generating the at least one fast-path trajectory may include modifying the a previously selected trajectory based on the at least one priority constraint determined based on the second perception data. In some examples, a system performing the method 400 may also consider one or more of the constraints and/or environmental features associated with the previously selected trajectory (e.g., received at 404*b*) in modifying the previously selected trajectory. Modifying the previously selected trajectory may include applying a time-bounded modification to the previously selected trajectory. The time-bound may be any arbitrary time bound and may be configured to ensure that the fast path 400*b* generates a trajectory faster relative to nominal path 400*a*. The time bounded modification may be limited to at most 200 milliseconds, at most 100 milliseconds, at most 90 milliseconds, at most 80 milliseconds, at most 70 milliseconds, at most 60 milliseconds, at most 50 milliseconds, at most 40 milliseconds, at most 30 milliseconds, at most 20 milliseconds, and/or at most 10 milliseconds. The time bounded modification may be limited to between 10 and 100 milliseconds, between 25 and 125 milliseconds, 50 and 150 milliseconds, 75 and 175 milliseconds, and/or 100 and 200 milliseconds. In some examples, modifying the previously selected trajectory may include applying a time-bounded non-linear optimization technique. Any time-bounded non-linear optimization technique may be utilized. For instance, a system performing process 400 may apply an iterative linear quadratic regulator, quadratic programming, or any other non-linear optimization technique.

As an example of a modification to the previously selected trajectory, the previously selected trajectory may guide the host vehicle to travel straight in the forward direction (e.g., minimal or no lateral movement). A vehicle in an adjacent lane may swerve toward the path indicated by the previously selected trajectory. The fast path 400*b* may modify the previously selected trajectory, for instance, by instructing a decrease in velocity or a lateral movement (e.g., angle right if the adjacent vehicle is swerving from the left) to avoid the swerving vehicle. The fast path 400*b* may modify the previously selected trajectory within a fraction of the time that it takes the nominal path 400*a* to generate a new trajectory avoid the swerving vehicle. The fast path generated trajectory may be compared to one or more outdated trajectories generated via the nominal path and may be selected to avoid a collision with the swerving vehicle. As described, the nominal path trajectories may be outdated because they are generated using perception data received at a first time (e.g., time t−1), while the fast path trajectories are generated using perception data received at a second time after the first time (e.g., time t−0.5).

At block 408, the process 400 may include selecting a trajectory from the at least one nominal trajectory and the at least one fast-path trajectory. Selecting a trajectory may include generating a respective trajectory score for the at least one nominal trajectory and the at least one priority trajectory. A system performing process 400 may be configured to generate a trajectory score (e.g., one or more metrics, a statistical representation of one or more metrics, etc.) for each trajectory generated using nominal path 400*a* and fast path 400*b*. In some examples, nominal path 400*a* is configured to generate a plurality of trajectories during each iteration (e.g., a plurality of trajectories may be generated using nominal path 400*a* each time new perception data is received by the nominal path). In some examples, fast path 400*b* is configured to generate a single trajectory during each iteration (e.g., a single trajectory may be generated using fast path 400*b* each time new perception data is received by the fast path). The plurality of trajectories generated by the nominal path, and the single trajectory generated by the fast path, may each be assigned a respective trajectory score. A trajectory may then be selected from the plurality of trajectories generated by the nominal path and the single trajectory generated by the fast path based on their respective scores.

The respective trajectory score(s) may be generated based on at least one of a safety metric, a feasibility metric, and a comfort metric. A safety metric may be determined based on factors such as likelihood of collisions, severity of such collisions, and/or other factors that my impact the safety of the vehicle, passengers in the vehicle and/or other actors external to the vehicle. A feasibility metric may be determined based on factors such as the host vehicle's capabilities such as maximum velocity, maximum acceleration, maximum turning angles, and so on. A comfort metric may be determined based on factors such as the magnitude of curvature of the trajectory, the required acceleration to follow the trajectory, and so on. A system performing the method 400 may compare the score(s) for the at least one nominal trajectory and the at least one fast-path trajectory and select a trajectory with the highest score.

In some examples, a trajectory may be selected from the at least one nominal trajectory and the at least one fast-path trajectory based on the most up-to-date perception data. For instance, a computing system performing the trajectory selection task may have access to the perception data that was used to generate the fast-path trajectory. Thus, for instance, if the fast-path trajectory was generated to avoid a swerving vehicle, the computing system may be aware of the swerving vehicle and account for the swerving vehicle during trajectory scoring and selection. The selected trajectory may be utilized for vehicle control and may also be utilized for the next iteration trajectory generation by fast path 400*b*.

At block 410, the process 400 optionally includes determining a vehicle control command based on the selected trajectory. For instance, a system performing process 400 may determine a steering command, a throttle command, and/or a break command to cause the host vehicle to travel along a selected trajectory. At block 412, the process 400 optionally includes transmitting a signal to a vehicle control component based on the determined vehicle control command. At block 414, the process 400 optionally includes controlling at least one of a throttle, brake, or steering input of the vehicle based on the signal.

Figure 5:
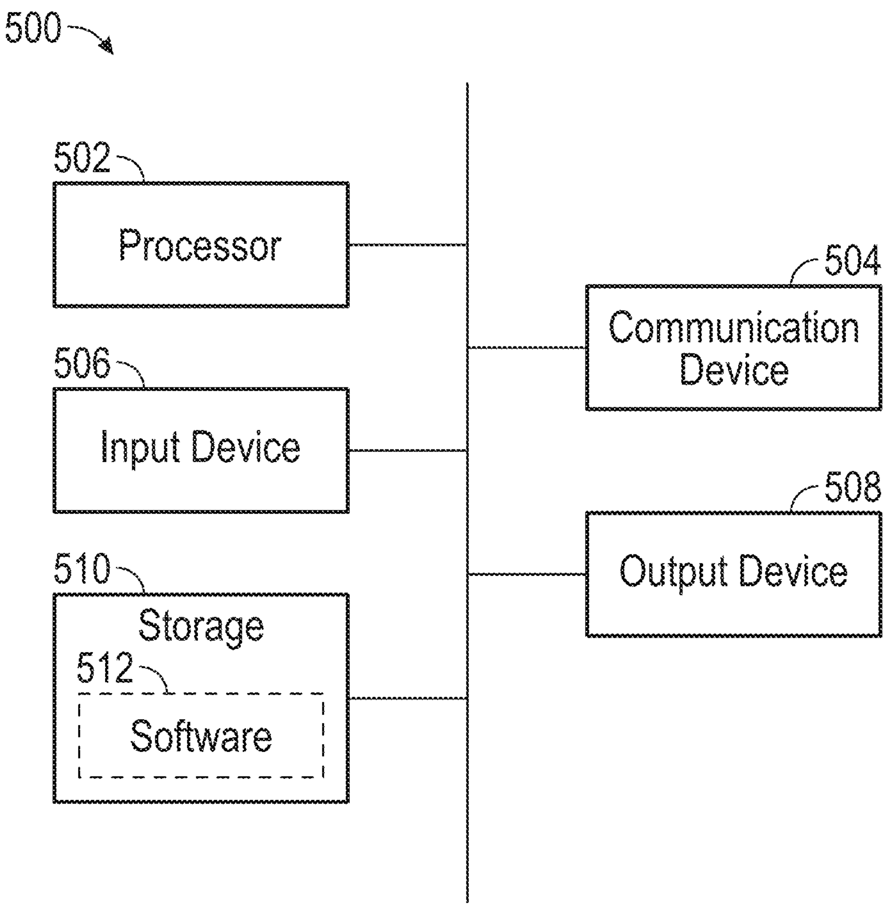
FIG. 5 illustrates an exemplary computing device according to some examples.

FIG. 5 depicts an exemplary computing device 500, that may be used for autonomous vehicle trajectory planning in accordance with one or more examples of the disclosure. Device 500 can be a host computer connected to a network. Device 500 can be a client computer or a server. As shown in FIG. 5, device 500 can be any suitable type of microprocessor-based device, such as a personal computer, workstation, server, or handheld computing device (i.e., a portable electronic device) such as a phone or tablet. The device can include, for example, one or more of processors 502, input device 506, output device 508, storage 510, and communication device 504. Input device 506 and output device 508 can generally correspond to those described above and can either be connectable or integrated with the computer.

Input device 506 can be any suitable device that provides input, such as a touch screen, keyboard or keypad, mouse, or voice-recognition device. Output device 508 can be any suitable device that provides output, such as a touch screen, haptics device, or speaker.

Storage 510 can be any suitable device that provides storage, such as an electrical, magnetic, or optical memory, including a RAM, cache, hard drive, or removable storage disk. Communication device 504 can include any suitable device capable of transmitting and receiving signals over a network, such as a network interface chip or device. The components of the computer can be connected in any suitable manner, such as via a physical bus or wirelessly.

Software 512, which can be stored in storage 510 and executed by processor 502, can include, for example, the programming that embodies the functionality of the present disclosure (e.g., as embodied in the devices as described above).

Software 512 can also be stored and/or transported within any non-transitory computer-readable storage medium for use by, or in connection with, an instruction execution system, apparatus, or device, such as those described above, that can fetch instructions associated with the software from the instruction execution system, apparatus, or device and execute the instructions. In the context of this disclosure, a computer-readable storage medium can be any medium, such as storage 510, that can contain or store programming for use by, or in connection with, an instruction execution system, apparatus, or device.

Software 512 can also be propagated within any transport medium for use by, or in connection with, an instruction execution system, apparatus, or device, such as those described above, that can fetch instructions associated with the software from the instruction execution system, apparatus, or device and execute the instructions. In the context of this disclosure, a transport medium can be any medium that can communicate, propagate, or transport programming for use by, or in connection with, an instruction execution system, apparatus, or device. The transport-readable medium can include, but is not limited to, an electronic, magnetic, optical, electromagnetic, or infrared wired or wireless propagation medium.

Device 500 may be connected to a network, which can be any suitable type of interconnected communication system. The network can implement any suitable communication protocols and can be secured by any suitable security protocols. The network can comprise network links of any suitable arrangement that can implement the transmission and reception of network signals, such as wireless network connections, T1 or T3 lines, cable networks, DSL, or telephone lines.

Device 500 can implement any operating system suitable for operating on the network. Software 512 can be written in any suitable programming language, such as C, C++, Java, or Python. In various embodiments, application software embodying the functionality of the present disclosure can be deployed in different configurations, such as in a client/server arrangement or through a Web browser as a Web-based application or Web service, for example.

Although the disclosure and examples have been fully described with reference to the accompanying figures, it is to be noted that various changes and modifications will become apparent to those skilled in the art. Such changes and modifications are to be understood as being included within the scope of the disclosure and examples as defined by the claims. Finally, the entire disclosure of the patents and publications referred to in this application are hereby incorporated herein by reference.

The invention claimed is:

1. A method for selecting a trajectory for a vehicle, the method comprising:

receiving first perception data from one or more sensors positioned on the vehicle at a first time;

generating, using a first trajectory planner, at least one nominal trajectory based on the first perception data;

receiving second perception data from the one or more sensors at a second time after the first time;

generating, using a second trajectory planner different from the first trajectory planner, at least one fast-path trajectory based on the second perception data; and selecting a trajectory from the at least one nominal trajectory and the at least one fast-path trajectory, wherein the first and second trajectory planners are configured for parallel operation such that the second trajectory planner can generate the at least one fast-path trajectory during a time interval when the first trajectory planner is generating the at least one nominal trajectory, and wherein the fast-path trajectory is generated in less time than the nominal trajectory.

2. The method of claim 1, wherein generating at least one fast-path trajectory based on the second perception data comprises:

determining at least one priority constraint based on the second perception data, wherein the at least one priority constraint comprises a constraint not determined based on the first perception data; and modifying a previously selected trajectory based on the at least one priority constraint.

3. The method of claim 2, wherein the at least one priority constraint is determined based on a priority environmental feature.

4. The method of claim 3, wherein the priority environmental feature comprises a detected environmental feature determined to be a priority environmental feature based on one or more predefined criteria.

5. The method of claim 2, wherein modifying the previously selected trajectory comprises applying a time bounded modification to the previously selected trajectory.

6. The method of claim 5, wherein applying the time bounded modification comprises applying a non-linear optimization technique.

7. The method of claim 2, wherein the at least one priority constraint is determined based on a detected object not detected in the first perception data.

8. The method of claim 2, wherein the priority constraint is determined based on a detected object within a temporal or spatial tolerance of a previous trajectory of the vehicle.

9. The method of claim 2, wherein the priority constraint is determined based on a detected object predicted to intersect with the previously selected trajectory of the vehicle.

10. The method of claim 2, wherein the priority constraint is determined based on a detected vulnerable road user.

11. The method of claim 1, wherein the selected trajectory is selected based on a most up to date perception data.

12. The method of claim 1, wherein selecting the trajectory comprises:

generating respective trajectory scores for the at least one nominal trajectory and the at least one priority trajectory;

comparing the respective trajectory scores for the at least one nominal trajectory and the at least one fast-path trajectory; and selecting a trajectory based on the comparison of the respective scores generated for each trajectory.

13. The method of claim 12, wherein the respective trajectory scores are generated based on at least one of a safety metric, a feasibility metric, and a comfort metric.

14. The method of claim 1, comprising: determining a vehicle control command based on the selected trajectory.

15. The method of claim 14, comprising: transmitting a signal to a vehicle control component based on the determined vehicle control command.

16. The method of claim 14, comprising: controlling at least one of a throttle, brake, or steering input of the vehicle based on the signal.

17. The method of claim 1, wherein generating the at least one nominal trajectory comprises:

for an action to be executed by the vehicle:

determining a plurality of constraints associated with the action based on the first perception data; and generating at least one feasible trajectory based on the plurality of constraints associated with the selected action.

18. The method of claim 17, wherein the plurality of constraints are determined based on at least one of static obstacles, dynamic obstacles, predicted actions of other actors, road features, speed limits, trajectory curvature limits, map data, and vehicle capabilities.

19. The method of claim 1, wherein the at least one nominal trajectory is generated without reference to a previously selected trajectory.

20. The method of claim 1, wherein generating the at least one nominal trajectory comprises generating a plurality of feasible trajectories.

21. The method of claim 1, comprising: storing the at least one nominal trajectory in a memory during a time between generating the at least one nominal trajectory and generating the at least one fast-path trajectory.

22. A system for selecting a trajectory for a vehicle, the system comprising one or more processors and memory storing one or more computer programs that include computer instructions, which when executed by the one or more processors, cause the system to:

receive first perception data from one or more sensors positioned on the vehicle at a first time;

generate, using a first trajectory planner, at least one nominal trajectory based on the first perception data;

receive second perception data from the one or more sensors at a second time after the first time;

generate, using a second trajectory planner different from the first trajectory planner, at least one fast-path trajectory based on the second perception data; and select a trajectory from the at least one nominal trajectory and the at least one fast-path trajectory, wherein the first and second trajectory planners are configured for parallel operation such that the second trajectory planner can generate the at least one fast-path trajectory during a time interval when the first trajectory planner is generating the at least one nominal trajectory, and wherein the fast-path trajectory is generated in less time than the nominal trajectory.

23. A non-transitory computer readable storage medium storing instructions for selecting a trajectory for a vehicle, the instructions configured to be executed by one or more processors of a computing system to cause the system to:

receive first perception data from one or more sensors positioned on the vehicle at a first time;

generate, using a first trajectory planner, at least one nominal trajectory based on the first perception data;

receive second perception data from the one or more sensors at a second time after the first time;

generate, using a second trajectory planner different from the first trajectory planner, at least one fast-path trajectory based on the second perception data; and select a trajectory from the at least one nominal trajectory and the at least one fast-path trajectory, wherein the first and second trajectory planners are configured for parallel operation such that the second trajectory planner can generate the at least one fast-path trajectory during a time interval when the first trajectory planner is generating the at least one nominal trajectory, and wherein the fast-path trajectory is generated in less time than the nominal trajectory.

* * * * *